(12) United States Patent
Reime

(10) Patent No.: US 9,835,752 B2
(45) Date of Patent: Dec. 5, 2017

(54) METAL DETECTOR

(75) Inventor: Gerd Reime, Buhl (DE)

(73) Assignee: SHANGHAI LANBAO SENSOR CO., LTD, Shanghai (CN)

( * ) Notice: Subject to any disclaimer, the term of this patent is extended or adjusted under 35 U.S.C. 154(b) by 1338 days.

(21) Appl. No.: 13/319,948

(22) PCT Filed: May 18, 2010

(86) PCT No.: PCT/EP2010/003005
§ 371 (c)(1),
(2), (4) Date: Nov. 10, 2011

(87) PCT Pub. No.: WO2010/133328
PCT Pub. Date: Nov. 25, 2010

(65) Prior Publication Data
US 2012/0049850 A1    Mar. 1, 2012

(30) Foreign Application Priority Data

May 18, 2009  (DE) .......................... 10 2009 021 804
Jun. 19, 2009  (DE) .......................... 10 2009 029 928

(51) Int. Cl.
*G01V 3/10*    (2006.01)
*G01V 3/08*    (2006.01)
(Continued)

(52) U.S. Cl.
CPC ................ *G01V 3/15* (2013.01); *G01V 3/107* (2013.01); *G01V 3/00* (2013.01); *G01V 3/08* (2013.01);
(Continued)

(58) Field of Classification Search
CPC .......... G01V 3/10; G01V 3/104; G01V 3/081; G01V 3/00; G01V 3/08
(Continued)

(56) References Cited

U.S. PATENT DOCUMENTS 4,255,711 A * 3/1981 Thompson ............. G01V 3/107
324/329
4,912,414 A * 3/1990 Lesky et al. .................. 324/329
(Continued)

FOREIGN PATENT DOCUMENTS

DE         3225166 A1     1/1984
DE       36193308 C1   12/1987
(Continued)

OTHER PUBLICATIONS

Buscher (Ebinger—Anmelder), DE 10301951 Machine Translation, p. 1-7, Oct. 28, 2004.*
(Continued)

*Primary Examiner* — Bot Ledynh
(74) *Attorney, Agent, or Firm* — Cantor Colburn LLP

(57) ABSTRACT

A sensor for the location of metallic objects and also an associated method comprise a plurality of transmitting coils (2.1, 2.2) and at least one receiving coil (1.9) which are arranged such as to be inductively coupled to one another and overlap to a partial extent for the purposes of decoupling the interaction therebetween, whereby there can be obtained a point of optimal cancellation of the interaction. Due to the fact that a flow of current is passed through the transmitting coils (2.1, 2.2) by a sensor electronic system, equal flows of current through the transmitting coils have an effect upon the at least one receiving coil (1.9) which results in a local point of optimal cancellation which moves in a first direction when there is a flow of current in a first transmitting coil (2.1), whereas it moves in another direction when there is a flow of current in a further transmitting coil (2.2), and due to the fact that there is provided a control circuit for the regulation of the currents in the transmitting coils which leads to a displacement of the local point of optimal can-
(Continued)

cellation which causes cancellation of the received signal, a simple and effective sensor is thereby produced.

23 Claims, 6 Drawing Sheets

(51) Int. Cl.
G01B 7/14 (2006.01)
G01V 3/15 (2006.01)
G01V 3/00 (2006.01)

(52) U.S. Cl.
CPC .............. *G01V 3/081* (2013.01); *G01V 3/10* (2013.01); *G01V 3/104* (2013.01)

(58) Field of Classification Search
USPC .......................................... 324/329, 223, 200
See application file for complete search history.

(56) References Cited

U.S. PATENT DOCUMENTS

| 5,557,206 | A * | 9/1996 | Won .................... 324/329 |
| 5,729,143 | A * | 3/1998 | Tavernetti et al. ............ 324/329 |
| 6,026,135 | A * | 2/2000 | McFee .................. C09D 11/00 250/392 |
| 6,559,645 | B2 * | 5/2003 | Arndt et al. .................. 324/329 |
| 7,414,404 | B2 * | 8/2008 | Keene .......................... 324/329 |
| 7,649,356 | B2 * | 1/2010 | Earle ............................. 324/326 |
| 7,656,153 | B2 * | 2/2010 | Westersten .................... 324/239 |
| 2008/0084212 | A1 * | 4/2008 | Wieland ....................... 324/329 |
| 2008/0303517 | A1 * | 12/2008 | Skultety-Betz et al. ...... 324/234 |
| 2013/0207648 | A1 * | 8/2013 | Zibold et al. ................. 324/232 |
| 2013/0300401 | A1 * | 11/2013 | Krapf et al. .................. 324/201 |

FOREIGN PATENT DOCUMENTS

| DE | 4339419 | C2 | 5/1995 | |
| DE | 10301951 | A9 | 10/2004 | |
| DE | 10318350 | B3 * | 12/2004 | ............ H03K 17/95 |
| DE | 102004047188 | A1 | 3/2006 | |
| DE | 102004047189 | A1 | 4/2006 | |
| DE | 102006053222 | A1 * | 5/2008 | ............ H03K 17/95 |
| EP | 0706648 | B1 | 9/1997 | |
| GB | 2262606 | A | 6/1993 | |
| WO | 0201021 | A2 | 1/2002 | |

OTHER PUBLICATIONS

Keller, DE 4339419 Machine Translation, p. 1-10, Sep. 18, 1997.*
Buscher, Andre et al., DE10301951(A1)—Jul. 15, 2004, PTO STIC Foreign Patent Service Center translation, p. 1-11.*
International Search Report PCT/EP2010/003005; dated Jan. 10, 2010.

* cited by examiner

METAL DETECTOR

CROSS REFERENCE TO RELATED APPLICATIONS

The present application claims the priority of the German patent applications 10 2009 021 804.1, filed on 18 May 2009, and 10 2009 029 928.9, filed on 19 Jun. 2009, the published content whereof is hereby expressly incorporated into the subject matter of the present application.

TECHNICAL FIELD

The invention relates to a sensor for the location of metallic objects, in particular a metal detector operated in the PI mode and also to an appertaining method.

BACKGROUND

A metal detector of this type operating in accord with the Pulse Induction process (PI) Mode is known from DE 103 01 951 A9. The interaction between the primary and secondary coils is decoupled by partially overlapping the co-planar coil systems. The decoupling is adjusted by means of mechanically displaceable masses in the region of the overlap or by means of auxiliary electrical compensating means e.g. in the form of additional compensation signals from the generator in the receiving circuit. They compensate for the incompletely decoupled component of the transmitting power in the receiving coil. A "feedback" between the detected signal in the receiving coil and the compensation effect, i.e. a closed regulating system is not present.

A comparable arrangement is known from DE 103 18 350 B3, wherein a plurality of coils are nested in overlapping, neighbouring but mutually displaced manner in regard to their magnetic alternating field. The largest coil, preferably the receiving coil determines the periphery of the coil arrangement.

A reversal of the principle specified above i.e. a surrounding transmitting coil with two receiving coils in the form of an "eight" is known from DE 36 19 308 C1, in which the transmitted field is mutually cancelled.

A metal detector comprising a transmitting coil and a receiving coil is known from DE 43 39 419 C2, these coils partially overlapping each other in such a way that the alternating inductance factor is minimal. The coils are operated alternately as transmitting and receiving coils.

In order to reduce capacitive cross-talk between the transmitting coil and the receiving coil when the transmitting and the receiving coil are located very close together as is the case for printed coils, a screening means in the form of a screening electrode between the transmitting and the receiving coil is proposed in DE 10 2004 047 189 A1. Further auxiliary windings are provided for fine adjustment purposes.

An amplitude regulating system wherein light signals are detected and compensation is made for external interference such as stray light and temperature or aging effects between light emitters and light receivers is known from EP 706 648 B1. The light emitters are operated periodically and alternately by a clock pulse generator. The light that has been amplitude regulated in at least one light path reacts as necessary in the light receiver with the light from a further light emitter such as a compensating light source for example in such a way that a received signal without clock synchronous signal components is produced. The signal received by the light receiver is supplied to a synchronous demodulator which breaks down the received signal into the signal components corresponding to the two sources of light. These are compared with one another in a comparator, whereby a state of the control value corresponding to a zero state is developed. If a signal corresponding to this zero state is not present at the output of the comparator, then this control value is used in order to appropriately regulate the radiating power which is being supplied to the sources of light until this state is reached.

BRIEF SUMMARY

The invention provides a simple and effective sensor and an appertaining method.

The sensor comprises at least one receiving coil and a plurality of transmitting coils or transmitting coil parts which divide up a transmitting coil in a certain way preferably in the form of mirror-image halves. As a result of the interaction between a plurality of transmitting coils and the at least one receiving coil whereby the transmitting coils are arranged to partially overlap the receiving coil, a local point of optimal cancellation of the fields transmitted by the transmitting coils occurs in the receiving coils.

Hereby, the coils are arranged in such a manner that, when the flow of current therethrough is the same, the transmitting coil parts have an effect on the at least one receiving coil by virtue of which a local point of optimal cancellation of the transmitted fields occurs in the receiving coils. However, this point shifts or moves in a first direction when the flow of current is mainly or solely through a first transmitting coil or a first part of the transmitting coil, whereas, when the flow of current is mainly or solely through a further transmitting coil or a further part of the transmitting coil, it shifts or moves in another direction which is preferably opposite to the first direction. This local point of optimal cancellation is affected by the approach to a metal. A control circuit for regulating the currents through the transmitting coil parts leads, when it is in its regulating state, to a displacement of the local point of optimal cancellation which causes cancellation of the received signal. The control value or the change thereof that is necessary for this purpose is preferably used as a measure for the nearness of a metal.

With this solution, there results a simple means for adjusting the decoupling between the transmitting and receiving system, even under constantly changing environmental conditions, e.g. when approaching a metal or in the event of mechanical changes of the coil body or in the presence of or changes in ground effects.

If a plurality of receiving coils and a plurality of transmitting coils are provided, at least one transmitting coil and at least one receiving coil can be arranged in different planes. The coils on one plane are rotated through a certain central angle, which is dependent on the specific form of application, relative to the coils on at least one further plane until the interaction of the coils is cancelled. In order to enable control action to be effected, whereby the control value simultaneously serves as the measured value, the coils are displaced at least slightly in parallel with each other by a distance of preferably 0.1 to two percent of the coil diameter for example or they are rotated in corresponding manner relative to each other. In consequence, the peripheries of the transmitting and receiving coils are located almost congruently on top of one another so that an extremely compact structure thereby results. In practice, an arrangement of the coils of this type, which can preferably be in the form of printed coils on the opposite sides of a printed circuit board, together with the described electronic system leads to a highly sensitive detecting system. In practice, given an overall diameter of the coil arrangement of 25 mm, a detection limit of over 500 mm could be achieved.

The signal induced in the receiving coils by the fields transmitted by the transmitting coils is supplied to an amplifier. When using e.g. two receiving coils, the receiving coils can be connected in series or also in parallel. The essential thing is that the signal induced in the receiving coils can be cancelled out. Preferably, an amplifier having symmetrical inputs can also be selected. A synchronous demodulator connected downstream of the amplifier and a following comparator can be provided for comparing the voltage signals associated with the transmitting coils for the purposes of determining a control value. The output of the comparator delivers the control value. The amplitude of the current supplied to the transmitting coils is regulated in preferably continuous manner in at least one regulated current source by means of the control value in such a way that the amplitudes of the voltage signals at the inputs of the comparator are substantially equal. This then corresponds to cancellation of the received signal in the receiving coil or the receiving coils. The cancellation corresponds in turn to complete decoupling between the transmitting coil and the receiving coils.

Due to the synchronous demodulation of the signals in the receiving coils and the comparison of the output signals associable with the clock phases by means of a comparator, an item of information (the control value) is obtained which is usable for controlling the currents in at least one of the transmitting coils. This then corresponds to a closed loop control. In the case of a mechanically correct arrangement of the transmitting coils relative to the receiving coil or the receiving coils, currents of equal amplitude are distributed to the transmitting coils by the regulation process i.e. the received signal is cancelled out in the receiving coil or both receiving coils in this case. The control value will then be located in a central control range for example. When approaching a metal for example, this control value changes accordingly, whilst the received signal remains cancelled in the receiving coil or coils. By contrast, not quite correct positioning of the transmitting coils and the receiving coils relative to each other due to possible manufacturing tolerances merely leads to a constant offset of the control value from the ideal state thereof.

In principle, especially in the case of printed coils, more than just two planes of coils could also be arranged on the printed circuit board.

Further advantages will be apparent from the appendant Claims and the following description.

BRIEF DESCRIPTION OF THE FIGURES

The invention is described in more detail hereinafter with the aid of exemplary embodiments which are illustrated in the accompanying Figures. Therein.

DETAILED DESCRIPTION

The invention will now be described exemplarily in more detail with reference to the accompanying drawings. Nevertheless, the exemplary embodiments are only examples which are not intended to limit the inventive concept to a certain arrangement. Before the invention is described in detail, it should be pointed out that it is not restricted to the particular components of the device nor to the particular method steps, since these components and processes can vary. The terms used here are merely intended to describe special embodiments and are not used in a restrictive sense. If, moreover, the singular or indefinite articles are used in the description or in the Claims, these also refer to a plurality of these elements insofar as the general context does not make it unambiguously clear that something else is meant.

The expression "local point of cancellation" that is used in this application refers to the point on an imaginary line between the centres of two transmitting coils which occurs when at least two field emitting coils of a fixed geometrical arrangement overlap and at which the current flow through the two coils extinguishes the magnetic field in the receiving coil or the receiving coils that is caused thereby.

Figure 1:
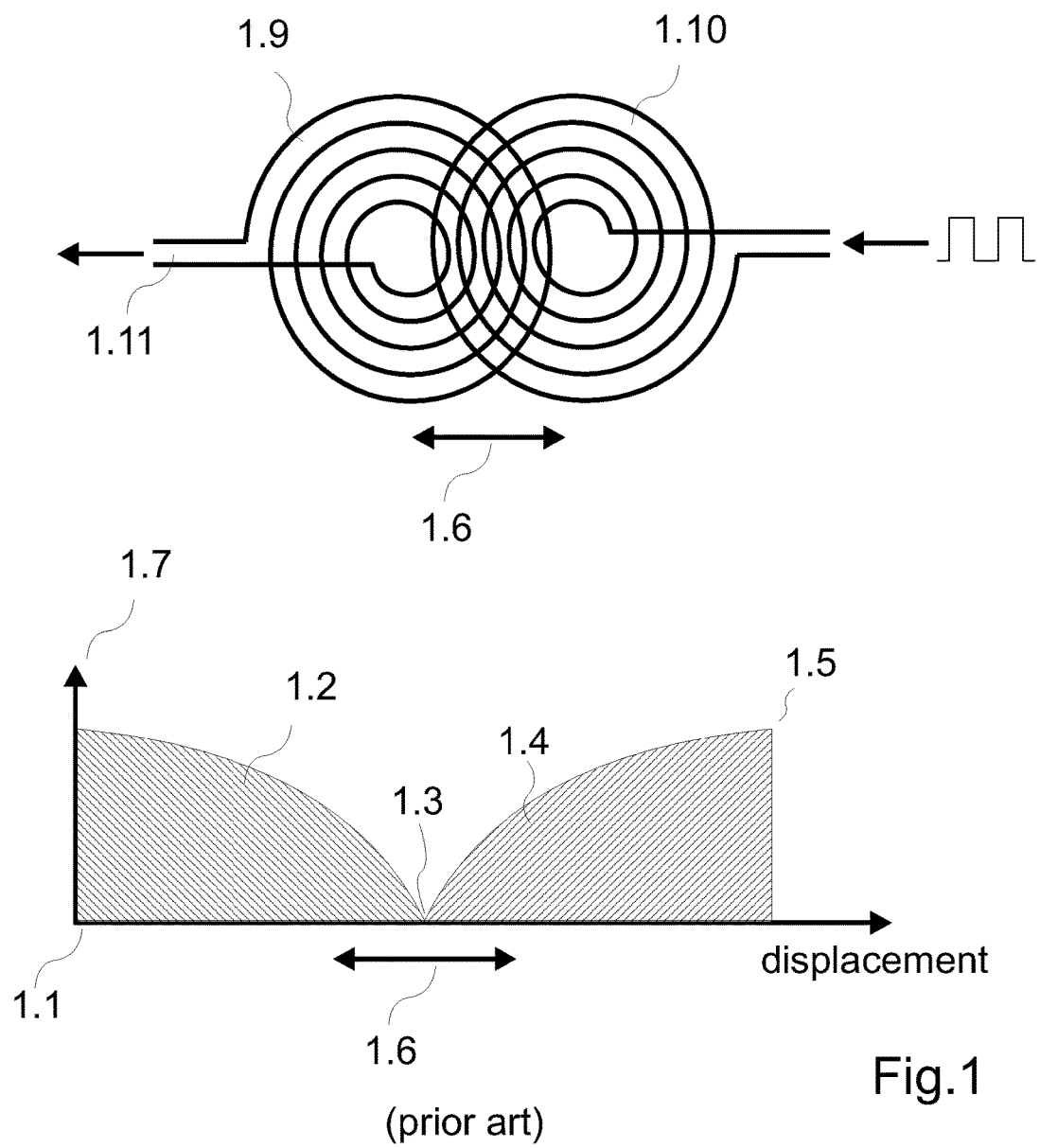
FIG. 1 shows a sensor system from the state of the art utilising the PI process and also the appertaining waveform of the amplitude at the receiving coil, FIG. 2 an arrangement of two mirror-image coil halves in a first exemplary embodiment, FIG. 3 a mechanical arrangement of the coil halves in accordance with FIG. 2 together with a receiving coil, FIG. 4 a sensor electronic system comprising a closed regulating system for stabilizing the local point of optimal cancellation in the receiving coil, FIG. 5, 6 displacements of the local point of optimal cancellation for different flows of current through the transmitting coil arrangement, FIG. 7 a diagram showing the control value of the sensor electronic system over time, FIG. 8 the arrangement of a first transmitting coil half and a first receiving coil half in a further exemplary embodiment, FIG. 9 the arrangement of the coils in accordance with FIG. 8 together with the connection elements leading to the electronic system, FIG. 10 the coil arrangement in accordance with FIG. 8 in the form of a section through a printed circuit solution, FIG. 11 a sensor electronic system in accordance with FIG. 10 comprising a closed regulating system for stabilizing the local point of optimal cancellation in the receiving coils.

FIG. 1 shows the waveform of the amplitude at the receiving coil 1.9 in a state of the art sensor system utilising the PI method when displacing the transmitting coil 1.10 or the receiving coil relative to each other. The amplitude 1.7 at the receiving coil is plotted against displacement in the lower part of FIG. 1. The displacement starts at 1.1 and ends at 1.5, whereby the displacement path thereby covered in the diagram from the point 1.3 of optimal cancellation amounts to e.g. +/−5 mm.

If, for example, the receiving coil is displaced in relation to the transmitting coil to the right in the direction of the double-headed arrow 1.6, the received signal 1.2 decreases at first. In the exemplary embodiment, the signal has a clock synchronous phase angle of 0° relative to the signal supplied to the transmitting coil. Upon reaching the local point of optimal cancellation, i.e. the decoupling point 1.3, the received signal is zero whereas, in the course of further displacement, the received signal 1.4 rises again but the phase thereof is now turned through 180°. The local point of optimal cancellation is relatively stable only in a laboratory environment. Manufacturing tolerances, the effects of temperature, mechanical deformation of the coil arrangement or the presence of e.g. ground effects e.g. when searching for metal in metal-containing ground displace this point. Furthermore, the local point is also displaced by a metallic object appearing in the vicinity of the arrangement. The possible geometrical position of a point of optimal cancellation in the case of any of the adverse effects specified above will be located e.g. within a range along the double-headed arrow 1.6.

Figure 2:
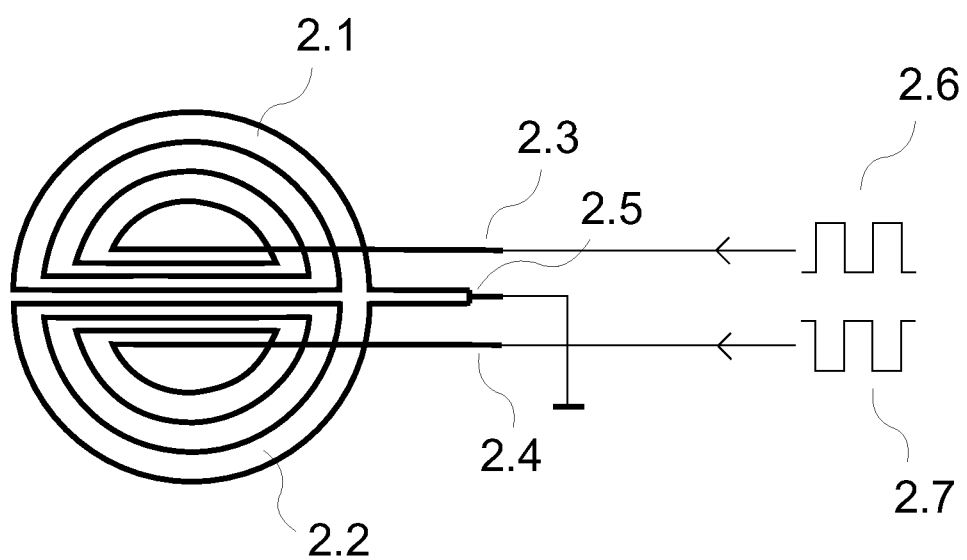

Despite all the above mentioned adverse effects, the point of optimal cancellation should always remain at exactly the same local position utilising simple means and a closed regulating system. This is achieved by the following measure:

The transmitting coil 1.10 in accord with the state of the art is divided and preferably halved in such a way as to form two substantially identical and mirror-image coil halves. Other types of sub-division are however possible, as long as a continuous or constant and thus not abrupt displacement of the local point of cancellation can be obtained thereby when there is an appropriate flow of current. FIG. 2 shows the arrangement of these coil parts or coil halves 2.1 and 2.2 as transmitting coils with the connections 2.3 for the first upper coil half 2.1 and 2.4 for the second lower coil half 2.2. The two remaining connections of the coil halves are combined at 2.5 in the exemplary embodiment. Complementary voltages 2.6 and 2.7 supplementing a voltage at the connections 2.3 and 2.4 cause a magnetic field of the same polarity to be produced in both coil halves. In this case, the two coil halves essentially behave in the same manner as just a single coil in the state of the art. The coil halves or better, the coil parts, are referred to hereinafter as transmitting coils 2.1, 2.2

Figure 3:
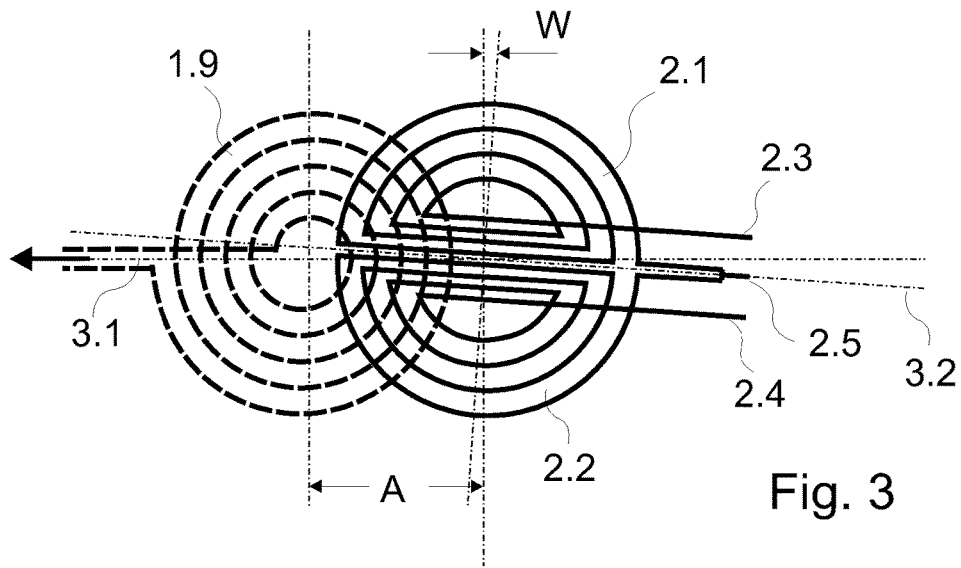

FIG. 3 shows a mechanical arrangement of the first upper transmitting coil 2.1 and the second lower transmitting coil 2.2 together with the receiving coil 1.9. In order to provide a clearer distinction, the receiving coil 1.9 is drawn with dashed lines. The diameter of the receiving coil 1.9, which is circular in this exemplary embodiment, corresponds approximately to the diameter of the semi-circular transmitting coil parts.

The horizontal axis 3.2 of the transmitting coil arrangement, which comprises the two transmitting coils 2.1 and 2.2, is tilted with respect to the horizontal axis 3.1 of the receiving coil 1.9 through the angle W. Consequently, the transmitting coil 2.2 overlaps the receiving coil 1.9 by a certain amount more than the transmitting coil 2.1. In practice, the angle W lies within a range of e.g. 1-10°. The larger the tolerances such as e.g. temperature effects, manufacturing tolerances etc. that are to be expected, the larger the angle W that has to be selected. There is a spacing A between the arrangement of the transmitting coils 2.1, 2.2 and the receiving coil 1.9—as measured from the respective centre points in the exemplary embodiment—which determines the approximate region in which the local point 1.3 for the decoupling will lie in the case of equally sized, but complementary voltages on the transmitting coils 2.1 and 2.2. Instead of rotation through an angle, different arrangements such as e.g. a displacement of the transmitting coils relative to each other are also conceivable so that differing overlaps of the receiving coil 1.9 thereby result. Consequently, the receiving coil is overlapped by different surface areas of the preferably two transmitting coils 2.1, 2.2. As long as the goal is achieved that a displacement of the local point of cancellation is attainable with an appropriate flow of current through the transmitting coil parts, it is irrelevant as to the particular geometrical arrangement of the transmitting coils with respect to the receiving coil by which this end is reached or facilitated.

Ideally, for the realization of the invention described above, a method incorporating an amplitude regulating system in accordance with the aforementioned EP 706 648 B1 has proved satisfactory for producing a sensitive metal detector. Other methods are however conceivable, as long as the point of optimal cancellation shifts in a first direction e.g. to the right, towards the point 5.1 when passing a flow of current through only a first part of the transmitting coil, whereas, when passing a flow of current through a second part of the transmitting coil, the point of optimal cancellation shifts in a further direction, preferably a second direction that is opposite to the first direction e.g. to the left, towards the point 6.1. A regulating process then ensures that a displacement of the local point of optimal cancellation is controlled and continuous cancellation of the received signal 1.11 thus takes place.

Figure 4:
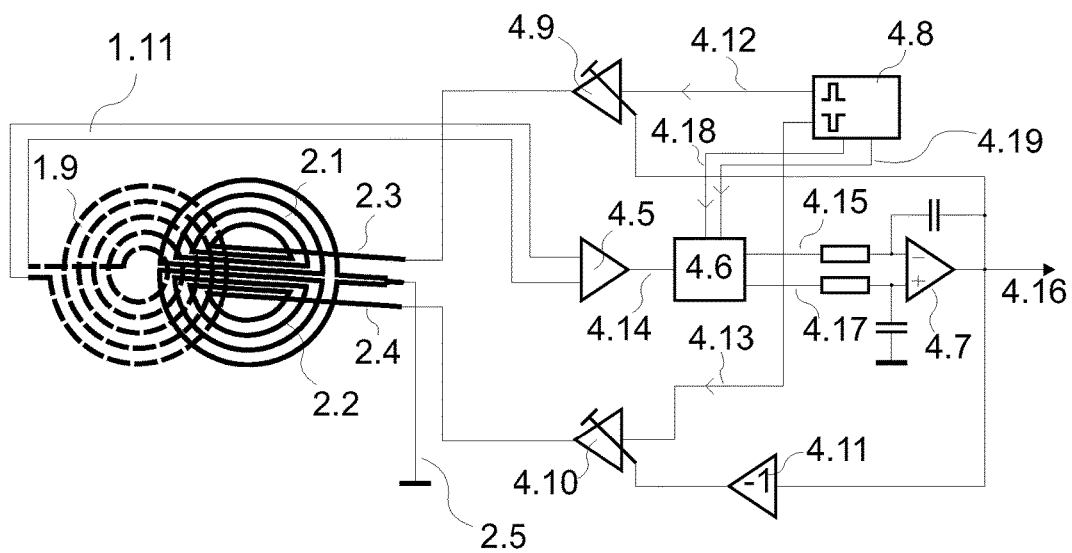

Here, FIG. 4 shows an exemplary embodiment of a sensor electronic system incorporating a closed regulating system for stabilizing the local point of optimal cancellation in the receiving coil 1.9 of a magnetic field produced in the transmitting coils 2.1 and 2.2. A clock pulse generator 4.8 delivers a first clock pulse signal 4.13 to a first regulated current source 4.10 and a second inverted clock pulse signal 4.12 to a second regulated current source 4.9. The frequency of the clock pulse generator can be selected in dependence on the inductance of the coils, in the exemplary embodiment, it is approx. 120 kHz. The signal can, for example, be a rectangular or a sinusoidal signal. The first regulated current source 4.10 feeds the connection 2.4 of the lower transmitting coil 2.2. In analogous manner thereto, the second regulated current source 4.9 feeds the connection 2.3 of the upper transmitting coil 2.1. The signal present at the receiving coil 1.9 is amplified by the alternating voltage amplifier 4.5—which is referred to hereinafter as the amplifier.

The output signal of the amplifier 4.5 is supplied to the synchronous demodulator 4.6. This receives a first clock pulse signal that is required for the demodulation process via 4.18 and a second clock pulse signal 4.19 from the clock pulse generator 4.8. In the simplest case, the synchronous demodulator 4.6 will supply the output signal of the amplifier 4.5 to the appropriate inputs of the integrating comparator 4.7 in synchronous manner during the entire period of a clock phase. In this case, the clock pulse signal 4.18 and 4.19 is as long as the transmit clock pulse phases.

Consequently, when the voltages of the first input signal 4.15 and the second input signal 4.17 of the integrating comparator 4.7 are the same, there will be no occurrence of a synchronous signal component in the receiving coil 1.9. Thereby, in the event of an external metal effect for example, the average value of a first clock pulse signal at the receiving coil 1.9 is compared with the average value of the second clock pulse signal. In the settled state, the received signals present at the inputs of the amplifier 4.5 already correspond to each other and thus to a zero state at the output of the amplifier so that the amplifier 4.5 only sees noise at the input thereof. Consequently, it can have a very high amplification factor, or be implemented in the form of a high amplification factor limiter amplifier. The same also applies in the settled state to the first input signal 4.15 and the second input signal 4.17. If a signal corresponding to this zero state is not present at the output of the comparator 4.7, then the control value 4.16 is adjusted and the current in the transmitting coils 2.1, 2.2 is thereby regulated until such time as this state is reached.

During the length of the clock pulse period, the output signal of the receiving coil 1.9 exhibits small amplitude waveforms that are determined by the type of metal. For better analysis of the metal's properties therefore, the sampling range of the synchronous demodulator can only be selected in sections of the clock pulse cycles. To this end, the first and second clock pulse signal 4.18 and 4.19 that are needed for the demodulation process are shortened accordingly and inserted into the sections of the clock phase that are needed for the metal analysis process. The sampling time points are freely selectable.

They can be selected in e.g. small steps of e.g. a few nanoseconds and may be located at arbitrarily predefined or predefinable points in the clock period or clock pulse signal in order to obtain specific information from the received signal.

The output signals of the synchronous demodulator 4.6 that are associable with the two clock pulse signals 4.12 and 4.13 by the synchronous demodulator 4.6 are examined for amplitude differences by the integrating comparator 4.7. The comparator can be implemented in the form of a high amplification factor comparator circuit. No matter how small, each of the deviations of the input voltages or input signals 4.15 and 4.17 leads to a corresponding deviation of the control value 4.16 from its instantaneous value. In practice, "open loop" amplifications of up to 240 dB have worked satisfactorily. This can be produced by e.g. two successive operational amplifiers which are damped in terms of alternating voltages and utilise DC negative feedback over the entire control loop, i.e. by including the coupling between the transmitting coils and the receiving coil therein. The regulated current sources 4.9 and 4.10 are controlled by the control value 4.16 in mutually inverted manner by means of the inverting stage 4.11 in order to re-establish the state in which input signals having equally large amplitudes occur at the comparator 4.7 i.e. the state in which no differences from the two signal waveforms appear at the inputs of the comparator 4.7. If the current from one of the regulated current sources rises, then it falls accordingly in the other.

Figure 5:
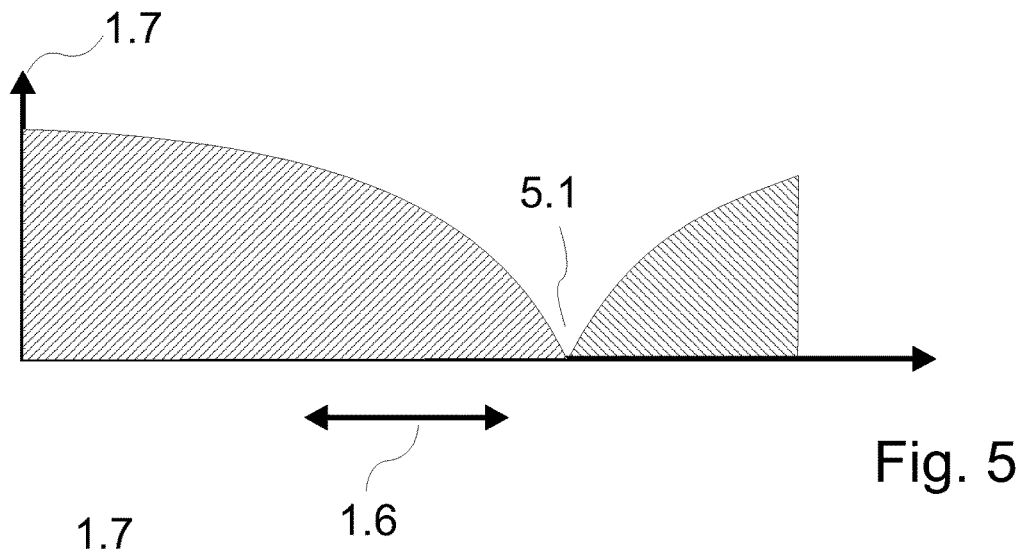
Figure 6:
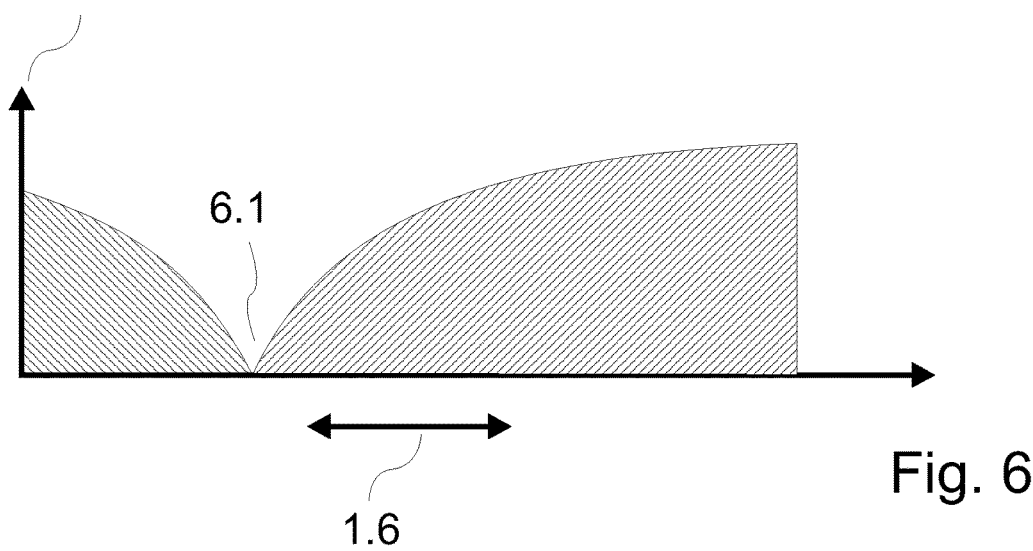

Due to the displacement of the current in the two coil halves i.e. in both transmitting coils, the local point of optimal cancellation is displaced in stepless manner over a wide range. The magnitude of the range depends on the size of the coil being used. It can amount to e.g. +/−5 mm in the case of a coil diameter of e.g. 50 mm. FIG. 5 shows the displacement of the local point 5.1 of optimal cancellation to the right when the lower transmitting coil 2.2 of the transmitting coil arrangement is receiving a larger current than the upper transmitting coil 2.1. In the reverse case of the transmission currents, the point 6.1 of optimal cancellation moves to the left in accordance with FIG. 6. The control circuit now ensures that the value determined for the point of optimal cancellation will be constantly readjusted in such a way as to result in there being no difference signal at the synchronous demodulator 4.6. This leads to the fact that time-varying or dynamic changes in the area surrounding the metal detector such as e.g. approach to a metal are reflected in the form of changes in the control value 4.16.

Figure 7:
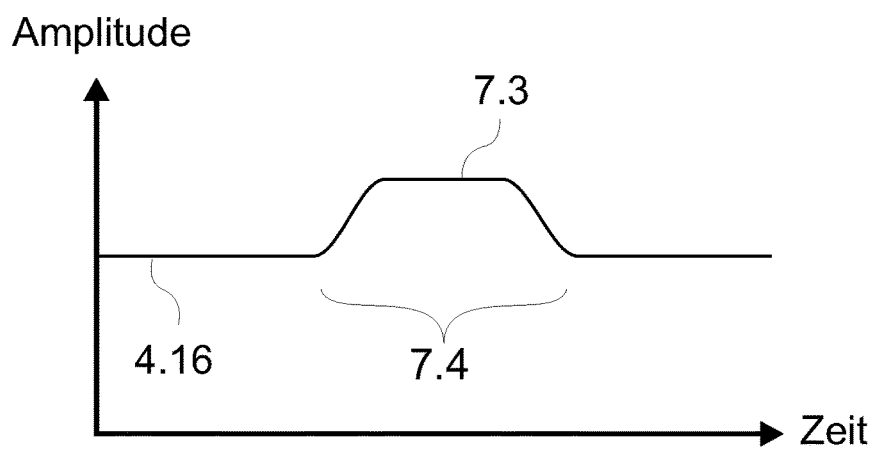

Consequently, without the influence of a metal within the sensor-active range, equilibrium of the transmission currents prevails in the sense that no clock synchronous components develop in the receiving coil 1.9 so that in consequence the point of optimal cancellation is always maintained. Thus, in accordance with FIG. 7, the control value 4.16 at the regulating output of the control circuit in FIG. 4 adopts a certain electrical value which corresponds to the local position of the point of optimal cancellation. Approach to a metal 7.4 alters the point of optimal cancellation. Consequently, a signal having clock pulse synchronous components appears in the receiving coil 1.9, this being detected by the synchronous rectification process and it is immediately readjusted by continuously adjusting the transmission currents in 4.9 and 4.10 until the clock pulse synchronous components in the receiving coil are extinguished. FIG. 7 shows the quiescent state of the control value 4.16 and the alteration thereof in the region of approach to a metal 7.4. Now for example, for the purposes of detecting approach to a metal, the difference between the quiescent state 4.16 and the altered control value 7.3 can be evaluated.

Thus, in this system utilising a closed regulating system, it is not the size of the signal developing in the receiving coil when approaching a metal that is measured and made visible to the user in an appropriate display as was the case in the state of the art, but rather, the control value or better still the alteration in the control value which occurs for the local displacement of the point of optimal cancellation when approaching a metal.

The adjustment is effected in the µs-range so that, even when sweeping rapidly over a metal, the output signal of the receiving coil will always be maintained in a state without clock pulse synchronous components at the synchronous demodulator. It is in principle sufficient here, for the current to be regulated in just one of the transmitting coils or transmitting coil halves, but the dynamic range would be restricted thereby.

In the case of a manufacturing tolerance, a temperature effect or else a ground effect, the control value 4.16 (offset) changes, but optimal cancellation of the signal 1.11 in the receiving coil 1.9 is maintained in every case.

Functioning of the divided transmitting coil arrangement:

In the ideal case, equal currents are passed through both transmitting coils 2.1 and 2.2 or they are supplied with an equal voltage and behave as a single coil. We will assume that the point of optimal cancellation lies in the centre as depicted in FIG. 1.

If current is passed "only" through the transmitting coil 2.2 in relation to the transmitting coil 2.1, the point 5.1 of optimal cancellation changes and migrates "to the right" in accordance with FIG. 5. That is to say, the transmitting coil arrangement would have to be displaced to the right with respect to the receiving coil in order to reach the point of optimal cancellation. Contrariwise, an exclusive flow of current through the transmitting coil 2.1 would cause the point 6.1 of optimal cancellation to migrate "to the left" in accordance with FIG. 6. Consequently, the transmitting coil arrangement would have to be displaced to the left in order to reach the point of optimal cancellation. Since, however, all possible current value ratios are possible due to the closed regulating system depicted in FIG. 4, the point of optimal cancellation can always be met with certainty in the case of a fixed transmitting coil arrangement. This is particularly important, if relatively large manufacturing tolerances of the coils have to be accepted. A "switching-in" of auxiliary windings as in DE 10 2004 047 189 A1 or mechanically displaceable masses is not required.

A further advantage lies in the high dynamic range but without the usually frequent "limiting" of the measured value data in the case of large metal parts if one falls below a certain spacing.

In the illustration in accordance with FIG. 2, the transmitting coil was illustrated as being round, but naturally however, other shapes are also possible e.g. the "double D" arrangement or an asymmetrical arrangement of the two displaced transmitting coils above and below the receiving coil that are known from the state of the art. This arrangement can also be used in analogous manner to the manner of operation described above using differential measuring methods such as, for example, the use of two receiving coils within the transmitting coils (patent DE 36 19 308 C1).

It is significant that the transmitting coil, or at least a substantial part of it, should be sub-divided and, in the case where the flow of current through the two coil parts is the same, should exert an effect upon the receiving coil or coils by virtue of which a local point of optimal cancellation 1.3 develops, and, in the case where a flow of current is only passed through a first half or a first part of the transmitting coil, the point of optimal cancellation will shift in a first direction e.g. to the right towards the point 5.1, whereas in the case where the flow of current passes through a second half or a second part of the transmitting coil, the point of optimal cancellation shifts in a second direction that is opposite to the first direction e.g. to the left towards the point 6.1. Furthermore, there is a continuous process of regulating the currents in the two transmitting coils which leads to a displacement of the local point of optimal cancellation, and thus causes a continuous cancellation of the received signal 1.11. The control value for the differential regulation of the current in the two transmitting coil halves is used for the purposes of evaluating the presence of metal.

FIGS. 8 to 11 show a further exemplary embodiment of the invention. As in the first exemplary embodiment, the point of optimal cancellation will always remain accurately at the same local position using simple means and a closed regulating system. This is achieved by using a plurality of transmitting coils 2.1, 8.3, preferably two, in the form of substantially identical and mirror-image coil halves in accordance with FIGS. 8, 9. In like manner, a plurality of receiving coils 8.1, 8.2 which are likewise formed by two substantially identical and mirror-image coil halves are used as the receiving coil in the exemplary embodiment. However, some other type of sub-division is possible as long as a continuous or constant and thus not abrupt displacement of the local point of cancellation can be obtained thereby using an appropriate flow of current.

FIG. 3 shows the overlapping arrangement of a receiving coil and the transmitting coil halves that are used there in the first exemplary embodiment. In order to significantly reduce the amount of space needed for that arrangement, a plurality of transmitting coils 2.1, 8.3 and a plurality of receiving coils 8.1, 8.2 are used in the second exemplary embodiment of FIGS. 8 to 11. To assist understanding, FIG. 8 only shows a first transmitting coil half 2.1 and a first receiving coil half 8.1 which is illustrated by dashed lines. The corresponding further halves supplement these semi-circular coils in order to form a circle, this thereby resulting in the diagram depicted in accordance with FIG. 9.

Figure 11:
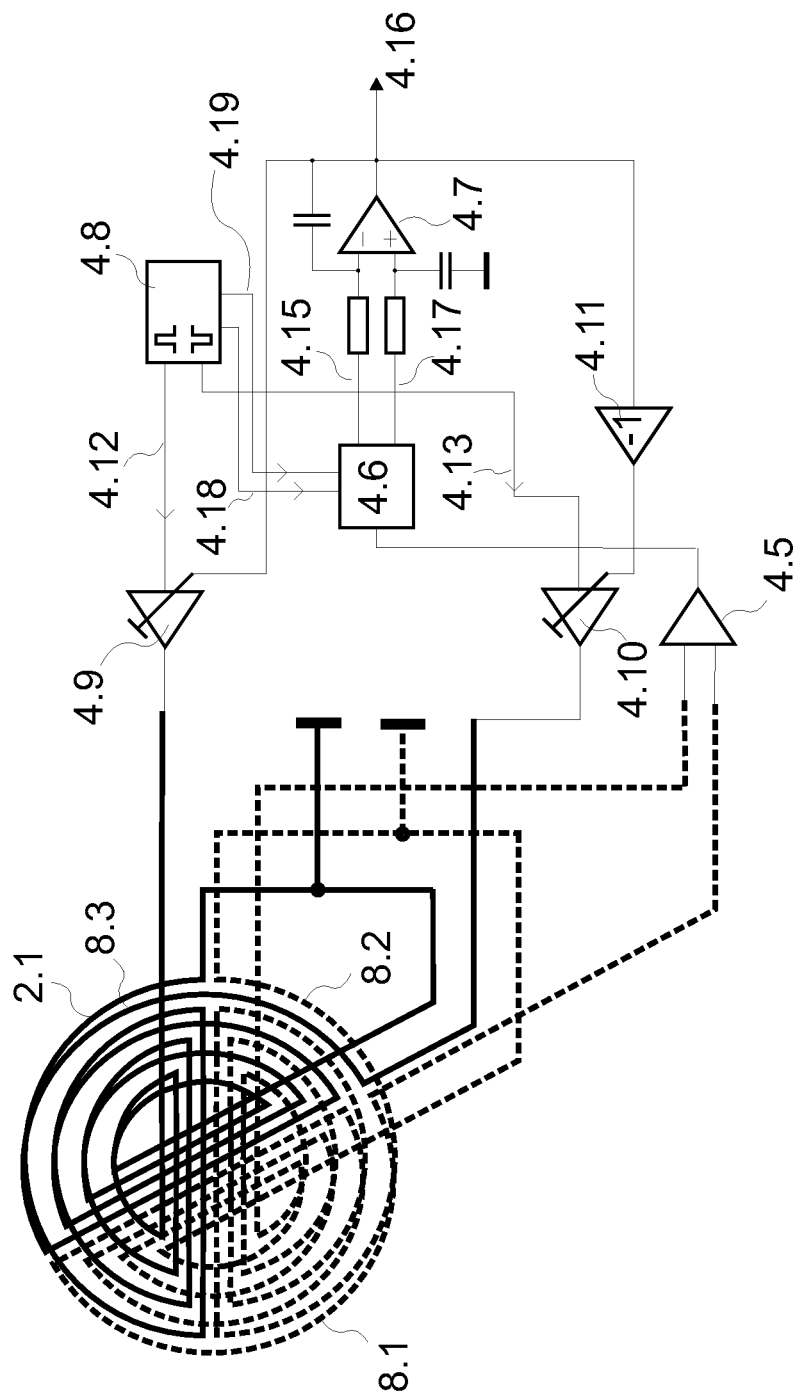

The transmitting coils 2.1, 8.3 and the receiving coils 8.1, 8.2 are inductively coupled to one another as in the first exemplary embodiment and are arranged in overlapping manner for interaction decoupling purposes. In principle, a point of optimal cancellation is attainable by a rotation/displacement as will be discussed hereinbelow. The flow of current through the transmitting coils and the evaluation of the received signal 4.20 from the receiving coils are effected by the sensor's electronic system which is illustrated in FIG. 11. In the case where the flow of current therethrough is the same, the transmitting coils 2.1, 8.3 exert an effect on the receiving coils by virtue of which a local point 1.3 of optimal cancellation is produced, i.e. in the fixed geometrical arrangement of overlapping coils, at a point on an imaginary line between the two transmitting coils at which the magnetic field induced in the receiving coils by the flow of current through the two coils cancels out. In the case of a flow of current through a first transmitting coil 2.1, the point of optimal cancellation moves in a first direction, whereas it moves in a second direction that is preferably opposite to the first direction when there is a flow of current through the other transmitting coil 8.3. Whereas, for equal current flows, the point of optimal cancellation was determined by the spacing A in the first exemplary embodiment, it is determined by the rotation of the upper coil halves each comprising at least one transmitting coil and one receiving coil with respect to the lower coil halves which each also comprise at least one transmitting coil and one receiving coil in the second exemplary embodiment.

By means of the control circuit for regulating the amplitude of the currents through the transmitting coils, it is possible to displace the local point of optimal cancellation in such a way as to result in cancellation of the received signal. For its part, the local point of optimal cancellation is in turn dependent on external influences on the magnetic field so that for example, approach to a metal can be detected due to a corresponding regulating action being effected. The control value 4.16 determined thereby is, at the same time, the measured value.

Figure 8:
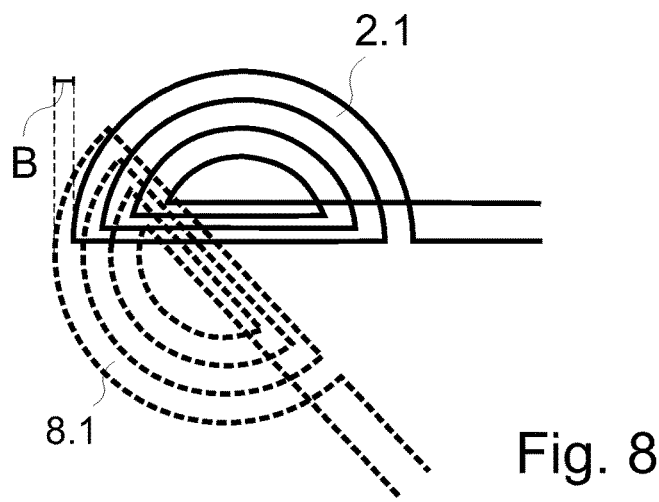
Figure 9:
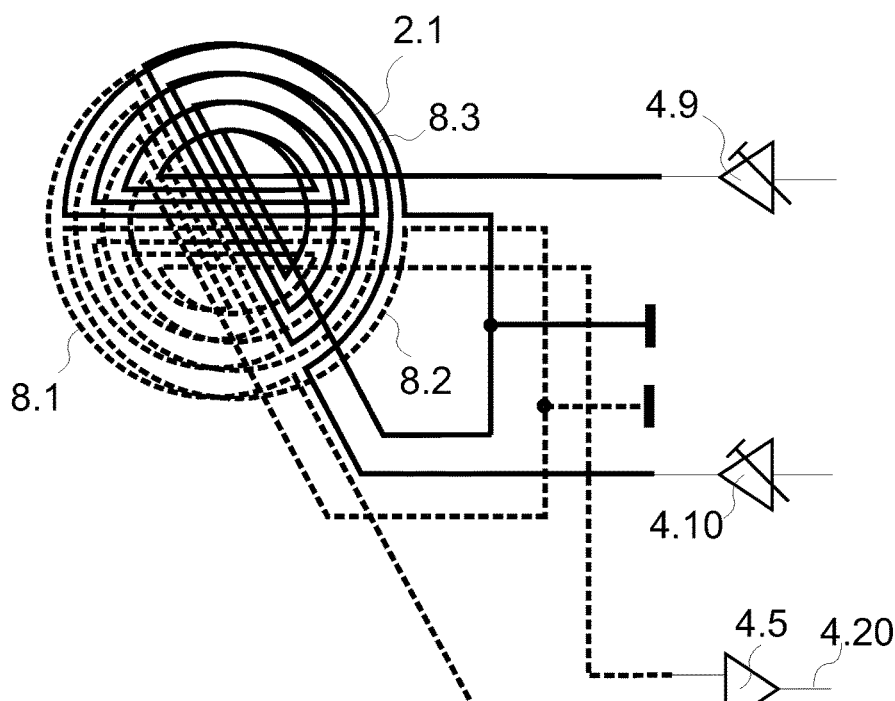
Figure 10:
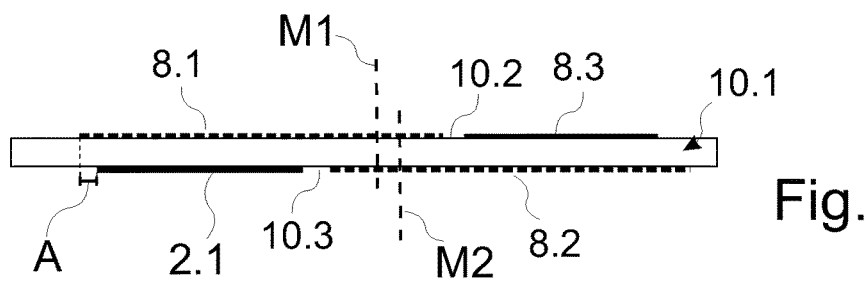

In accordance with FIGS. 8 to 10, at least one transmitting coil 2.1; 8.3 and at least one receiving coil 8.2; 8.1 are arranged in a first plane 10.2 and in at least one further plane 10.3. The coils arranged in the first plane are rotated relative to the coils arranged in the at least one further plane through a central angle taken with respect to their notional common central axis M1, M2 as is evident in particular from FIG. 8. If the coils actually lie above one other so that their peripheries are congruent, then this will result in at least one central angle at which cancellation takes place in dependence upon the particular application. In order now to arrive at a state in which the regulating circuit can perform its regulating function and thus produce a control value, then, commencing from this "cancelled state", the planes on which the coils are located are displaced in parallel with one another. In other words, the central axes M1, M2 thereof are displaced relative to each other by the distance B in FIGS. 8 and 10. This distance can be very small, and generally 0.1 to two percent of the coil diameter is sufficient.

FIG. 10 shows that the mirror-image coil opposite the transmitting coil 2.1 in the plane 10.3 is the receiving coil 8.2, whilst the first receiving coil 8.1 is supplemented by the second transmitting coil 8.3. The transmitting coil 2.1 and the receiving coil 8.2 lie in the further plane 10.3 and the transmitting coil 8.3 and the receiving coil 8.1 are on the first plane 10.2.

FIG. 10 shows the coil arrangement in the form of a section through a printed circuit solution, wherein only two planes 10.2 and 10.3 are shown. It is self evident that in the case of a printed circuit solution, further planes with further coils are also conceivable. The substrate 10.1, i.e. the printed circuit board carries the upper and lower planar coils. The transmitting coil 8.3 and the receiving coil 8.1 are located together above in this illustration, whilst the transmitting coil 2.1 and the receiving coil 8.2 lie below. By appropriate positioning of the upper coils with respect to the lower coils, the signal being transmitted by the transmitting coils is completely cancelled in the receiving coils 8.1, 8.2. Whereas in the first exemplary embodiment a tilting angle leads to a displacement of the centre point of the coil arrangement, in the second exemplary embodiment, a displacement by the distance B, which can amount to 0.5 mm for example, is effected. In principle however, tilting and displacement could also be combined if so required. The essential point is that the point of optimal cancellation can always be held as accurately as possible at the same local position so that the control value is usable as a measured value as a consequence of the closed regulating system such as is illustrated in FIG. 11. The receiving coils can be connected in parallel or in series as long as cancellation is possible.

The transmitting coils 2.1, 8.3 and the receiving coils 8.1, 8.2 are formed by a plurality of coils parts which together take the form of a preferably circular arrangement, the transmitting coils and the receiving coils preferably being formed by two coil halves which are of substantially the same size as in the exemplary embodiment.

FIG. 11 shows an exemplary embodiment of a sensor's electronic system incorporating a closed regulating system for stabilizing the local point of optimal cancellation in the receiving coils 8.1, 8.2 of a magnetic field produced in the transmitting coils 2.1 and 8.3. A clock pulse generator 4.8 delivers a first clock pulse signal 4.13 to a first regulated current source 4.10 and a second inverted clock pulse signal 4.12 to a second regulated current source 4.9. The frequency of the clock pulse generator can be selected in dependence on the inductance of the coils and is approx. 120 kHz in the exemplary embodiment. The signal can be a rectangular or a sinusoidal signal for example. The first regulated current source 4.10 feeds the connection of the one transmitting coil. Analogously thereto, the second regulated current source 4.9 feeds the connection of the other transmitting coil. The signal in the receiving coils is amplified by the alternating voltage amplifier 4.5—which is referred to as the amplifier hereinafter. The output signal of the amplifier 4.5 is supplied to the synchronous demodulator 4.6. This receives a first clock pulse signal that is necessary for the demodulation process via 4.18 and a second clock pulse signal 4.19 from the clock pulse generator 4.8. In the simplest case, the synchronous demodulator 4.6 will supply the output signal of the amplifier 4.5 during the entire period of a clock phase in synchronous manner to the corresponding inputs of the integrating comparator 4.7. In this case, the clock pulse signal 4.18 and 4.19 is as long as the transmit clock pulse phases.

Consequently, in the case where the voltages of the first input signal 4.15 and the second input signal 4.17 of the integrating comparator 4.7 are the same, no synchronous signal component will occur in the receiving coils 8.1, 8.2. Hereby, in the event of the external effect of a metal for example, the average value of a first clock pulse signal at the receiving coils 8.1, 8.2 is compared with the average value of the second clock pulse signal. In the settled state, the received signals present at the inputs of the amplifier 4.5 already correspond to a zero state so that the amplifier 4.5 only sees noise at the input thereof. Consequently, it can have a very high amplification factor or be implemented as a high amplification factor limiter amplifier. The same also applies to the first input signal 4.15 and the second input signal 4.17 in the settled state. If there is no signal corresponding to this zero state at the output of the comparator 4.7, the control value 4.16 is adjusted and hence the current in the transmitting coils 2.1, 8.3 is regulated until such time as this state is reached.

The control circuit now ensures that the value determined for the point of optimal cancellation is constantly readjusted in such a way that there will be no difference signal at the synchronous demodulator 4.6. This leads to the time-varying or dynamic changes in the field surrounding the metal detector such as occur when approaching a metal for example being perceived in the form of a change of the control value 4.16.

It is self evident that this description can be subjected to the most diverse of modifications, changes and adaptations which fall within the range of equivalents to the appended Claims.

The invention claimed is:

1. A sensor comprising:
   at least one transmitting coil and at least one receiving coil which are inductively coupled to one another and are arranged in partly overlapping manner for decoupling an interaction there between, whereby there can be obtained a decoupling point of the interaction;
   a sensor electronic system for passing a flow of current through the at least one transmitting coil and for evaluating a signal received by the at least one receiving coil;
   wherein the at least one transmitting coil comprises a plurality of transmitting coils through which a plurality of flows of current are passed by the sensor electronic system;
   wherein, in the case of equal current flows, the plurality of transmitting coils have an effect upon the at least one receiving coil such that a local decoupling point occurs;
   wherein the plurality of transmitting coils comprises at least one first transmitting coil and at least one further transmitting coil, wherein the plurality of flows of current comprises a first flow of current and a second flow of current, wherein in the case of the first flow of current being uneven through the first transmitting coil, the local decoupling point moves in a first direction, whereas in the case of the second flow of current being uneven through the further transmitting coil, the local decoupling point moves in a second direction, and
   the sensor further comprising a control circuit having a control value, the control circuit being configured for cancelling the signal received by at least one receiving coil by regulating the plurality of flows of current through the plurality of transmitting coils,
   and the control value of the control circuit is used as a measured value for the nearness of a metal.

2. A sensor in accordance with claim 1, wherein the plurality of transmitting coils and the at least one receiving coil are arranged in co-planar manner.

3. A sensor in accordance with claim 1, wherein the plurality of transmitting coils are formed by a plurality of transmitting coil parts which together have an approximate shape of a transmitting coil that corresponds to the at least one receiving coil.

4. A sensor in accordance with claim 1, wherein at least two transmitting coils of the plurality of transmitting coils overlap the receiving coil with differing surface areas.

5. A sensor in accordance with claim 1, wherein a plurality of receiving coils and the plurality of transmitting coils are provided, wherein the at least one first transmitting coil and the at least one receiving coil are arranged in a first plane and the at least one further transmitting coil and at least one further receiving coil are arranged in at least one further plane, wherein the coils arranged in the first plane are rotated relative to the coils arranged on the at least one further plane through a central angle with respect to their notional common central axis for the purposes of cancelling the interaction of the coils, wherein the central axes are offset or displaced relative to each other.

6. A sensor in accordance with claim 5, wherein the periphery of the plurality of transmitting coils is approximately congruent with the periphery of the plurality of receiving coils.

7. A sensor in accordance with claim 5, wherein at least one of the plurality of transmitting coils or the at least one receiving coil of the plurality of receiving coils is formed by a plurality of coil parts.

8. A sensor in accordance with claim 1, wherein the plurality of transmitting coils or the at least one receiving coil are formed by two coil halves of substantially the same size.

9. A sensor in accordance with claim 1, wherein an axis of symmetry of the plurality of transmitting coils is tilted through an angle with respect to an axis of symmetry of the at least one receiving coil.

10. A sensor in accordance with claim 1, wherein central points of an arrangement of the plurality of transmitting coils and the at least one receiving coil are spaced from each other by a distance which determines the range within which the local decoupling point will lie in the case of equal currents through the plurality of transmitting coils.

11. A sensor in accordance with claim 1, wherein there is provided a comparator for comparing voltage signals associated with the plurality of transmitting coils for the purposes of determining the control value, and there is provided at least one regulated current source in which the control value for the regulation of an amplitude of current supplied to the plurality of transmitting coils regulates the amplitude of current in such a way that amplitudes of the voltage signals at inputs of the comparator are substantially equal or such that there is no difference in the voltage signals at the inputs of the comparator from two clock sections of a clock cycle.

12. A sensor in accordance with claim 11, wherein a change of the control value which leads to the movement of the local decoupling point when approaching the metal is the measured value.

13. A method for locating objects utilizing a sensor, the sensor comprising at least one transmitting coil and at least one receiving coil which are inductively coupled to one another and are arranged in partly overlapping manner for decoupling an interaction there between, whereby there can be obtained a decoupling point at which cancellation of a received signal is caused, the method comprising:
 passing a plurality of flows of current through the at least one transmitting coil;
 evaluating the received signal received by the at least one receiving coil,
 wherein the plurality of flows of current is passed through a plurality of transmitting coils by a sensor electronic system,
 wherein the at least one transmitting coil comprises a plurality of transmitting coils, wherein, in the case of equal current flows, the plurality of transmitting coils have an effect upon the at least one receiving coil such that a local decoupling point occurs,
 wherein the plurality of transmitting coils comprises at least one first transmitting coil and at least one further transmitting coil, wherein the plurality of flows of current comprises a first flow of current and a second flow of current, wherein, in the case of the first flow of current being uneven through the at least one first transmitting coil, the local decoupling point moves in a first direction, whereas in the case of the second flow of current being uneven through the at least one further transmitting coil, the local decoupling point moves in a second direction,
 wherein the plurality of flows of current through the plurality of transmitting coils are regulated in such a way that there results a displacement of the local decoupling point which causes cancellation of the received signal, and
 wherein a control value of a control circuit serves as a measured value for the nearness of a metal object and is configured for regulating the plurality of flows of current through the plurality of transmitting coils and the control circuit is configured for cancelling the signal received by the at least one receiving coil.

14. A method in accordance with claim 13, wherein there are used as the plurality of transmitting coils a plurality of transmitting coil parts, which together have the shape of a transmitting coil that corresponds to the at least one receiving coil.

15. A method in accordance with claim 13, wherein two transmitting coil halves of substantially the same size are used as the plurality of transmitting coils.

16. A method in accordance with claim 13, wherein an axis of symmetry of the plurality of transmitting coils, is arranged such that it is tilted through an angle with respect to an axis of symmetry of the at least one receiving coil.

17. A method in accordance with claim 13, wherein the receiving coil is overlapped by at least two transmitting coils of the plurality of transmitting coils with differing surface areas.

18. A method in accordance with claim 13, wherein for the production of the sensor there are provided a plurality of receiving coils and the plurality of transmitting coils, of which the at least one first transmitting coil and the at least one receiving coil are arranged in a first plane and the at least one further transmitting coil and at least one further receiving coil are arranged in at least one further plane, wherein coils arranged in the first plane are rotated relative to coils arranged on the at least one further plane through a central angle with respect to their notional common central axis until the interaction of the coils is cancelled, wherein the central axes (are then displaced relative to each other by a spacing.

19. A method in accordance with claim 13, wherein voltage signals associated with the plurality of transmitting coils are compared for the purposes of determining the control value, and the control value regulates an amplitude of the current supplied to the plurality of transmitting coils by means of at least one regulated current source in such a way that amplitudes of the voltage signals at the inputs of the comparator are substantially equal.

20. A method in accordance with claim 19, wherein a change of the control value which leads to the displacement of the local decoupling point is used as the measured value.

21. A method in accordance with claim 13, wherein the plurality of transmitting coils are controlled at a clock rate of a clock pulse generator and the signals received by the receiving coil are sampled at the clock rate, wherein the sampling time points are freely selectable, are controlled in steps of nanoseconds and are located at predefined positions in a clock period in order to obtain specific information from the received signal.

22. A sensor in accordance with claim 1, wherein it is a metal detector operated in the PI mode.

23. A method in accordance with claim 13, wherein the sensor is operated in a PI Mode as metal detector.

\* \* \* \* \*